United States Patent
Michaels

(10) Patent No.: US 8,654,819 B2
(45) Date of Patent: Feb. 18, 2014

(54) SYSTEMS AND METHODS FOR PULSE ROTATION MODULATION ENCODING AND DECODING

(75) Inventor: Alan J. Michaels, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 315 days.

(21) Appl. No.: 13/166,067

(22) Filed: Jun. 22, 2011

(65) Prior Publication Data

US 2012/0327975 A1  Dec. 27, 2012

(51) Int. Cl.
H04B 1/00 (2006.01)
(52) U.S. Cl.
USPC .......................................... 375/150
(58) Field of Classification Search
USPC .......................... 341/83; 370/208, 343, 347;
375/130–153, 219, 230, 242, 259, 260,
375/295, 316, 350; 380/33, 263, 268;
714/746, 780, 785
See application file for complete search history.

(56) References Cited

U.S. PATENT DOCUMENTS

| 6,798,825 | B1 * | 9/2004 | Horne .......................... 375/146 |
| 1,000,236 | A1 | 1/2011 | Michaels et al. |
| 1,000,246 | A1 | 1/2011 | Michaels et al. |
| 1,000,479 | A1 | 1/2011 | Michaels et al. |
| 1,001,971 | A1 | 1/2011 | Michaels et al. |
| 1,001,981 | A1 | 1/2011 | Michaels et al. |
| 7,921,145 | B2 | 4/2011 | Michaels |
| 7,937,427 | B2 | 5/2011 | Chester et al. |
| 7,962,540 | B2 | 6/2011 | Michaels et al. |
| 7,970,809 | B2 | 6/2011 | Michaels et al. |
| 7,974,413 | B2 | 7/2011 | Chester et al. |
| 7,995,757 | B2 | 8/2011 | Michaels et al. |
| 8,005,221 | B2 | 8/2011 | Chester et al. |
| 2008/0120529 | A1 * | 5/2008 | Sugiura et al. ................ 714/780 |
| 2008/0198832 | A1 | 8/2008 | Chester |
| 2008/0294956 | A1 | 11/2008 | Chester et al. |
| 2009/0110197 | A1 | 4/2009 | Michaels |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |

(Continued)

OTHER PUBLICATIONS

Information about Related Patents and Patent Applications, see section 6 of the accompanying Information Disclosure Statement Letter, which concerns Related Patents and Patent Applications.

*Primary Examiner* — Sam K Ahn
*Assistant Examiner* — Shawkat M Ali
(74) *Attorney, Agent, or Firm* — Fox Rothschild LLP; Robert J. Sacco

(57) ABSTRACT

Systems (600) and methods (500) for Pulse Rotation Modulation. The methods involve: generating First Segments ("FSs") of a Numerical Sequence ("NS") based on a First Data Symbol Sequence ("FDSS"); and encoding FDSS within NS. The encoding is achieved by: (a) shifting positions of numbers contained in each FS "X" positions to the right or left; and (b) moving a last "X" numbers of the FSs to a beginning of a respective segment thereof or moving a first "X" numbers of the FSs to an end of the respective segment. X" is defined as an integer value represented by a respective portion of FDSS. Thereafter, the NS having FDSS encoded therein can be used to spread a Second Data Signal ("SDS") over a wide intermediate frequency band. SDS has second data symbols, that are different then FDSS, phase and/or amplitude encoded therein.

22 Claims, 10 Drawing Sheets

(56) References Cited

U.S. PATENT DOCUMENTS

| | | |
|---|---|---|
| 2009/0296860 A1 | 12/2009 | Chester et al. |
| 2009/0300088 A1 | 12/2009 | Michaels et al. |
| 2009/0310650 A1 | 12/2009 | Chester et al. |
| 2009/0327387 A1 | 12/2009 | Michaels et al. |
| 2010/0054228 A1 | 3/2010 | Michaels |
| 2010/0091700 A1 | 4/2010 | Michaels |
| 2010/0165828 A1 | 7/2010 | Michaels et al. |
| 2010/0166041 A1 | 7/2010 | Michaels et al. |
| 2010/0226497 A1 | 9/2010 | Michaels et al. |
| 2010/0309957 A1 | 12/2010 | Chester et al. |
| 2010/0310072 A1 | 12/2010 | Michaels et al. |
| 2010/0316090 A1 | 12/2010 | Chester et al. |
| 2011/0222584 A1 | 9/2011 | Michaels |
| 2011/0286544 A1* | 11/2011 | Avudainayagam et al. .. 375/295 |

* cited by examiner

SYSTEMS AND METHODS FOR PULSE ROTATION MODULATION ENCODING AND DECODING

BACKGROUND OF THE INVENTION

1. Statement of the Technical Field

The invention concerns communication systems. More particularly, the invention concerns communications systems in which phase rotation modulation encoding and decoding are performed.

2. Description of the Related Art

There are many spread spectrum communication systems known in the art. Such spread spectrum communication systems often employ modulation techniques to encode data at baseband, while spread spectrum techniques permit a system to increase bandwidths of the transmitted signals and lower the power spectral density, effectively spreading the signal energy. Such baseband modulation techniques include Frequency Shift Keying ("FSK") modulation techniques, Phase Shift Keying ("PSK") techniques, Pulse Amplitude Modulation ("PAM") techniques, Phase Shift Keying Modulation ("PSK") techniques and On Off Keying ("OOK") techniques. Each of the listed modulation techniques are well known in the art, and therefore will not be described herein. Spread spectrum techniques generally involve combining a modulated baseband signal with a typically much higher rate numerical sequence. Such sequences can take the form of binary-level amplitude and/or phase modulations such as those used in Direct Sequence Spread Spectrum ("DSSS") or multi-level amplitude and/or phase modulations such as those used in Chaotic Sequence Spread Spectrum ("CSSS").

Spread spectrum signals have an added degree of freedom in the timing axis since a spread ratio "M" is determined by a data symbol rate (which defines the information throughput) and a spreading chip rate. The spread ratio "M" can be written in two equivalent ways, as shown by the following Mathematical Equations (1) and (2).

$$M = (\text{spreading chip rate})/(\text{data symbol rate}) \quad (1)$$

$$M = (\text{symbol duration})/(\text{chip duration}) \quad (2)$$

Increases in the spread ratio "M" represent an increase in signal robustness and security, and a decrease in the information density (measured in bits/hertz/second). The information density is often used as a measure of channel efficiency. In effect, the higher the spread ratio "M", the greater the expansion in signal bandwidth.

Spread spectrum communication systems typically also qualify as Multiple Access (MA) communication systems. In MA communication systems, the total channel capacity can be shared between multiple users simultaneously. The channel efficiency in MA communication systems is equal to the information density of a single user times the total number of users accessing the channel simultaneously. In theory, the aggregate efficiency/capacity of the users in an MA communication system is equal to that of a single user with the identical channel and the sum of the MA signal energies. In practice, implementation trade offs and coordination of communications between the users in the MA communication system (each of which practically have different channels) reduce the aggregate channel efficiency to significantly less than that of a non-shared spectrum. Moreover, there may not be enough users in the channel at one time to fully use the spectrum, which leaves channel capacity underutilized.

In Frequency Division MA ("FDMA") communication systems, the excess channels can be assigned to users in the network. The users are thereby allowed to transmit either wider bandwidth signals or use additional carriers. The FDMA communication system works well when there are a small number of users. However, the FDMA communication system does not provide a significant improvement in the security of the waveform as compared to that of other communication systems since the instantaneous energy density of a channel in use is relatively high.

Frequency hopping FDMA communication systems (that are well coordinated by a shared time basis) improve the robustness of the transmitted signal against interferers (anti-jam characteristics). Still, the detection characteristics of the frequency hopping FDMA communication systems are not significantly improved over non-frequency hopping FDMA communication systems. In this regard, it should be noted that frequency hopping reduces that average energy density, but not the instantaneous energy density.

In Code Division MA ("CDMA") communication systems, modulated signal energy is spread broadly over a large frequency spectrum. As a result of this spreading, the instantaneous and average energy densities are reduced. As such, the CDMA communication systems have improved robustness, anti-jam characteristics and probability of detection characteristics.

The most common spread spectrum technique employed by CDMA communication systems is a DSSS technique. Although DSSS based CDMA communication systems improved the security of transmission, they still suffer from certain drawbacks. For example, the signals generated by DSSS based CDMA communication systems have cyclo-stationary features subject to detection by feature detectors.

The advent of digital chaotic spread spectrum communication systems allows for spread spectrum transmission of signals without the presence of cyclo-stationary features. The elimination of the cyclo-stationary features limits the detection capability of an adversary to only energy detection. One of the greatest benefits of chaotic spread spectrum signals is that interfering energy received in band is averaged over the entire bandwidth. As a result, the digital chaotic spread spectrum communication systems have better overall performance as compared to other communication systems. Despite the improved performance and robustness of the digital chaotic spread spectrum communication systems, they still exhibit limitations. For example, the information rate of digital chaotic spread spectrum communication systems is limited by the range of adaptability in the spread ratio "M". As such, an individual user's channel efficiency, when security is maximized, is often limited to an order of magnitude around one and ten hundredth (0.01-0.10) of bits per hertz per second. Lower spreading ratios tend to eliminate the traditional advantages of spread spectrum communication systems.

There is a desire to increase this channel efficiency so that a single user is allowed to increase his/her total information delivered without increasing the spreading chip rate or the data symbol rate. One method to do this is to spread data symbols that have multiple levels of baseband phase and amplitude modulation. In this scenario, the amount of data delivered is increased linearly by the base-2 logarithm of the number of points in a signaling constellation.

Another method to increase the channel efficiency is to employ a Pulse Position Modulation ("PPM") technique. In PPM, the data of a transmitted symbol is encoded into one of a plurality of timeslots within a pre-defined frame or epoch and then detected using techniques similar to on-off keying modulations. As an example, a PPM encoding scheme conveys all of its energy in a single timeslot chosen out of a total of "W" possible timeslots, thereby permitting transmission of log$_2$(W) bits of data each epoch. PPM techniques are well known in the art, the therefore will not be described in detail herein. However, it should be noted that the performance of a PPM based communication system is limited by the number of total timeslots since one (1) timeslot where the pulse is transmitted must overcome the random energy accumulation occurring in the other timeslots. An approximated performance in a stationary channel of the PPM based communication system is defined by a stochastic decision between W-1 independent noise accumulations and the intended (unknown) single signal plus noise accumulation. Increasing the value of W leads to greater potential for false positives, and therefore a higher required Signal-to-Noise Ratio ("SNR"). Such a process can be quantified using order statistics. Order statistics are well known in the art, and therefore are not described herein. In general, PPM is a very simple and computationally efficient modulation technique. However, other modulation techniques provide better data throughput performance for high SNRs.

SUMMARY OF THE INVENTION

Embodiments of the present invention concern implementing systems and methods for Pulse Rotation Modulation ("PRM") encoding and decoding. The method embodiments involve: generating a plurality of first segments of a numerical sequence based on a number of characters represented by first data; and encoding the first data within the numerical sequence. The encoding is achieved by: shifting positions of the numbers contained in each of the first segments "X" positions to the right or left; and moving a last "X" numbers of the first segments to a beginning of a respective segment thereof or moving a first "X" numbers of the first segments to an end of the respective segment. "X" is defined as an integer value represented by a respective portion of the first data.

The method embodiments also involve decoding the rotated numerical sequence having the first data encoded therein ("the encoded numerical sequence"). The decoding is achieved by: generating a coherent numerical sequence which is the same as and time synchronized with the non-rotated numerical sequence; performing a circular cross-correlation process using the encoded numerical sequence and the coherent numerical sequence to determine an amount of rotation for each of the first segments of the numerical sequence; and generating estimates of PRM symbols based on the previously determined amounts of rotation for the first segments of the numerical sequence. The specifics of the circular cross-correlation process will become more evident as the discussion progresses.

According to aspects of the present invention, the encoded numerical sequence is used as a spreading sequence. The spreading sequence is used to spread a baseband data signal over a wider frequency band. The spreading is achieved by combining a data signal with the higher-rate spreading sequence having the first data already encoded therein. The data signal comprises second data that is independent from the first data. The data signal can include, but is not limited to, a baseband phase modulated signal and/or a baseband amplitude modulated signal. The result of the spreading is referred to herein as a spread spectrum signal. The spread spectrum signal is subsequently decoded to obtain the first data and/or the second data therefrom.

The first data is obtained from the spread spectrum signal by: generating a coherent numerical sequence which is the same as and time synchronized with the non-rotated numerical sequence; performing a circular cross-correlation process using the received spread spectrum signal and the coherent numerical sequence to determine an amount of rotation for each of the first segments of the numerical sequence; and generating estimates of PRM symbols based on the previously determined amounts of rotation for the first segments of the numerical sequence.

The second data is obtained from the spread spectrum signal by: generating a coherent numerical sequence which is the same as and time synchronized with the non-rotated numerical sequence; performing a circular cross-correlation process using the received spread spectrum signal and the coherent numerical sequence to determine an amount of rotation for each of the first segments of the spreading sequence; cyclically rotating each of the second segments of the coherent numerical sequence by a previously determined respective amount of rotation; and generating soft symbol estimates of encoded second data by combining the spread spectrum signal with the coherent numerical sequence that comprises the second segments which were previously cyclically rotated.

According to other aspects of the present invention, the respective portion of the first data comprises one more data characters, such as binary encoded data bits. The bits can represent, but are not limited to, text, sound, pictures, navigational-position information, and/or any other types of useful payload information that can be communicated. Moreover, the data characters may be chosen from non-binary radices without limitation. Each of the first number segments includes a quantity of numbers that is equal to or greater than the possible integer values which can be represented by the respective portion of the first data. Alternatively, each of the first number segments includes an integer multiple of possible values which can be represented by the respective portion of the first data.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
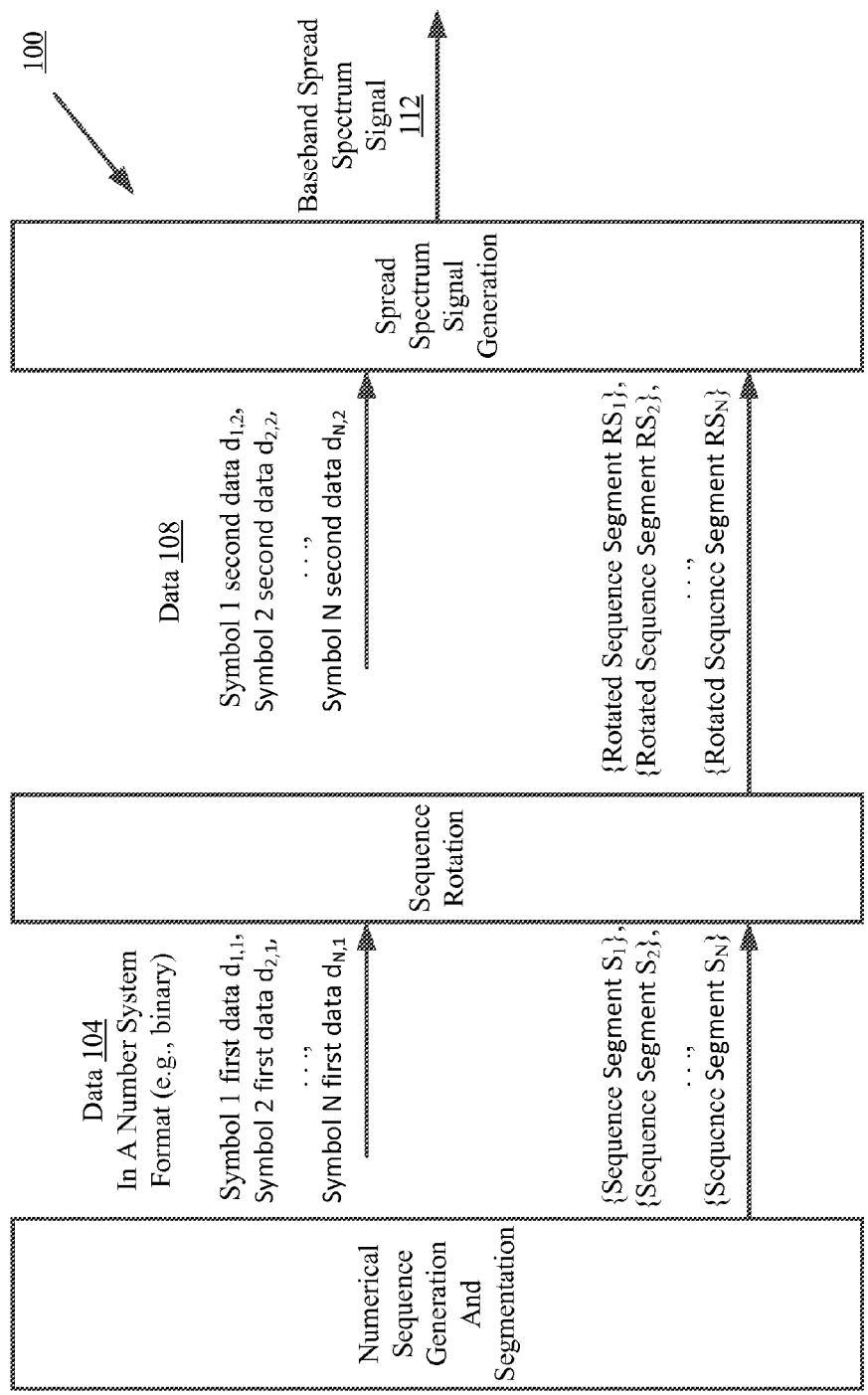
FIGS. 1-2 are conceptual diagrams that are useful for understanding an exemplary orthogonal carrier circular Pulse Rotation Modulation ("PRM") process of the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

The present invention concerns implementing systems and methods for orthogonal carrier circular PRM and demodulation. The method embodiments of the present invention combine traditional DSSS and Coherent Sequence Spread Spectrum ("CSSS") techniques on discrete-time discrete-amplitude symbol constellations with an intra-symbol pulse rotation that shifts the location of the expected symbol correlation peak within a known range of a PRM symbol duration. In this regard, it should be understood that method embodiments of the present invention generally involve: generating a spreading sequence; performing a PRM encoding process by encoding first data within the spreading sequence; generating a spread spectrum communications signal using the PRM encoded spreading sequence and second data; transmitting the spread spectrum communications signal from a transmitter to a receiver; performing a circular cross-correlation process to correlate the spread spectrum communications signal with a coherent non-rotated despreading sequence; and demodulating the spread spectrum signal to obtain the first and second data.

The PRM encoding process generally involves: segmenting the spreading sequence to obtain a plurality of numerical sequence segments $S_1, S_2, \ldots, S_N$; and cyclically rotating the values ("chips") of each numerical sequence segment $S_1, S_2, \ldots, S_N$ "X" positions to the right or left to obtain a plurality of rotated numerical sequence segments $RS_1, RS_2, \ldots, RS_N$. The spreading sequence, and thereby the constituent sequence segments, can consist of real-valued number sequences or complex-valued number sequences with any a priori defined amplitude, phase or statistical characteristics. Generation techniques for such spreading sequences are well understood by those skilled in the art, so are not described in detail herein. "X" is defined as an integer value represented by a portion of the first data (e.g., an integer value represented by a set of eight binary bits contained in the first data). The data encoded into the rotation of a numerical sequence segment may be independent from symbol to symbol, and possibly contain a dynamic amount of data per symbol. The phrase "cyclically rotating the numbers" refers to (a) the shifting of positions of the chips of sequence segment $S_1, S_2, \ldots,$ or $S_N$ a certain number of positions to the right or left and (b) rotating backwards/forwards excess chips, in order, to the beginning/end of the sequence segment $S_1, S_2, \ldots,$ or $S_N$. The rotated numerical sequence segment contains the same values as the non-rotated numerical sequence segment, so the total signal energy contained within the symbol duration is identical (negligible variations caused by filtering near symbol edges) whether rotated or not. The particularities of the PRM encoding process will become more evident as the discussion progresses.

Notably, communication systems implementing the above described method embodiments have improved throughput or information densities as compared to that of conventional communication systems. The improved throughput or information densities are at least partially a result of the ability to encode additional data within a spreading sequence. The additional data is encoded within the spreading sequence by cyclically rotating numbers within segments of the spreading sequence in accordance with integer values represented by one or more bits contained in command, control and/or user data. Such increases in data modulation capacity do not result in lower spreading ratios, so the core benefits of spread spectrum communication systems are retained, even when providing greater than one tenths (0.1) bits/Hz/sec efficiencies. Also, the security of the transmitted information, when fundamentally tied to the time-domain, frequency-domain or statistical characteristics of the spreading sequence, is generally maintained in implementing systems of the present invention. Stated differently, the security of the transmitted information is similar or the same in the implemented systems of the present invention and the conventional communication systems.

The present invention can be used in a variety of applications. Such applications include, but are not limited to, wireless communication applications and/or any other communication applications in which improved throughout is desired when employing spread spectrum signaling techniques. Concepts that are useful for understanding the present invention will be described below in relation to FIGS. 1-4. Exemplary methods will be described below in relation to FIG. 5. Exemplary implementing systems will be described in relation to FIGS. 6-10.

Concepts that are Useful for Understanding the Present Invention

Referring now to FIG. 1, there is provided a conceptual diagram that is useful for understanding an exemplary PRM encoding process of the present invention. As shown in FIG. 1, the PRM encoding process begins with the generation of at least one numerical sequence segment. The numerical sequence can include, but is not limited to, a pseudo-random number sequence, a random number sequence and/or a chaotic number sequence. There are many methods known in the art for generating such numerical sequences. Any such known method can be used with the present invention without limitation. Alternatively, the numerical sequence can be a pseudo-random sequence generated as a result of the performance of a DSSS modulation process. DSSS modulation processes are well known in the art, and therefore will not be described herein.

If a plurality of numerical sequences are generated, then each numerical sequence comprises a segment $S_1, S_2, \ldots, S_N$ of a larger numerical sequence $\{S_1, S_2, \ldots, S_N\}$. If only one (1) numerical sequence $\{S_1, S_2, \ldots, S_N\}$ is generated, then the numerical sequence is divided into a plurality of sequence segments $S_1, S_2, \ldots, S_N$. The sequence segments $S_1, S_2, \ldots, S_N$ can include the same or different amount of values. For example, a first sequence segment $S_1$ comprises two hundred fifty six (256) numbers. A second sequence segment $S_2$ includes two hundred fifty six (256) numbers or five hundred twelve (512) numbers. Embodiments of the present invention are not limited in this regard. However, it should be noted that it is more complex to implement a process in which sequence segments of different amounts of values are provided than a process in which sequence segments of the same amounts of numbers are provided.

The amount of values (or "chips") contained in each sequence segment $S_1, S_2, \ldots, S_N$ is determined while considering the number of bits of data 104 to be encoded in that data symbol. For example, if a first set of eight (8) bits of data 104 represents a first symbol character, then the first sequence segment $S_1$ may be chosen to include "i" times two hundred fifty six (256) numbers (or $i \cdot 2^8$ numbers), where "i" is a natural number. In contrast, if a second set of nine (9) bits of data 104 represents a second character, then the second sequence segment $S_2$ includes "i" times five hundred twelve (512) numbers (or $i \cdot 2^9$ numbers). Embodiments of the present invention are not limited in this regard In particular, the data 104 need not have a binary representation, but rather can be from any chosen number radix.

As shown in FIG. 1, the sequence segments $S_1, S_2, \ldots, S_N$ are then used in a sequence rotation process to generate PRM symbols. The sequence rotation process generally involves cyclically rotating the numbers of each sequence segment $S_1, S_2, \ldots, S_N$ to the right or left based on the content of data 104. Note that each sequence segment $S_1, S_2, \ldots, S_N$ represents an independent symbol and is rotated by a corresponding, yet independent, data value $d_{1,1}, d_{2,1}, \ldots, d_{N,1}$. The phrase "cyclically rotating the numbers" generally refers to (a) the shifting of positions of the chips a certain number of positions to the right or left and (b) rotating backwards/forwards excess chips, in order, to the beginning/end of the sequence segment $S_1, S_2, \ldots,$ or $S_N$. The cyclic rotation is performed on a symbol-by-symbol basis and a segment-by-segment basis, pairing the $k^{th}$ first data $d_{k,1}$ with the associated $k^{th}$ sequence segment $S_k$. The cyclic rotation operations will become more evident as the discussion progresses. As a result of this cyclic rotation of the values within the sequence segments $S_1, S_2, \ldots, S_N$, the data 104 can be communicated through a network via the detected rotation in the numerical sequence. The data 104 can be in any number system format. For example, the data 104 can be in a binary number system format in which a set of eight (8) bits represents one (1) character (e.g., a numerical character or an alphabetic character). Embodiments of the present invention are not limited in this regard.

Figure 2:
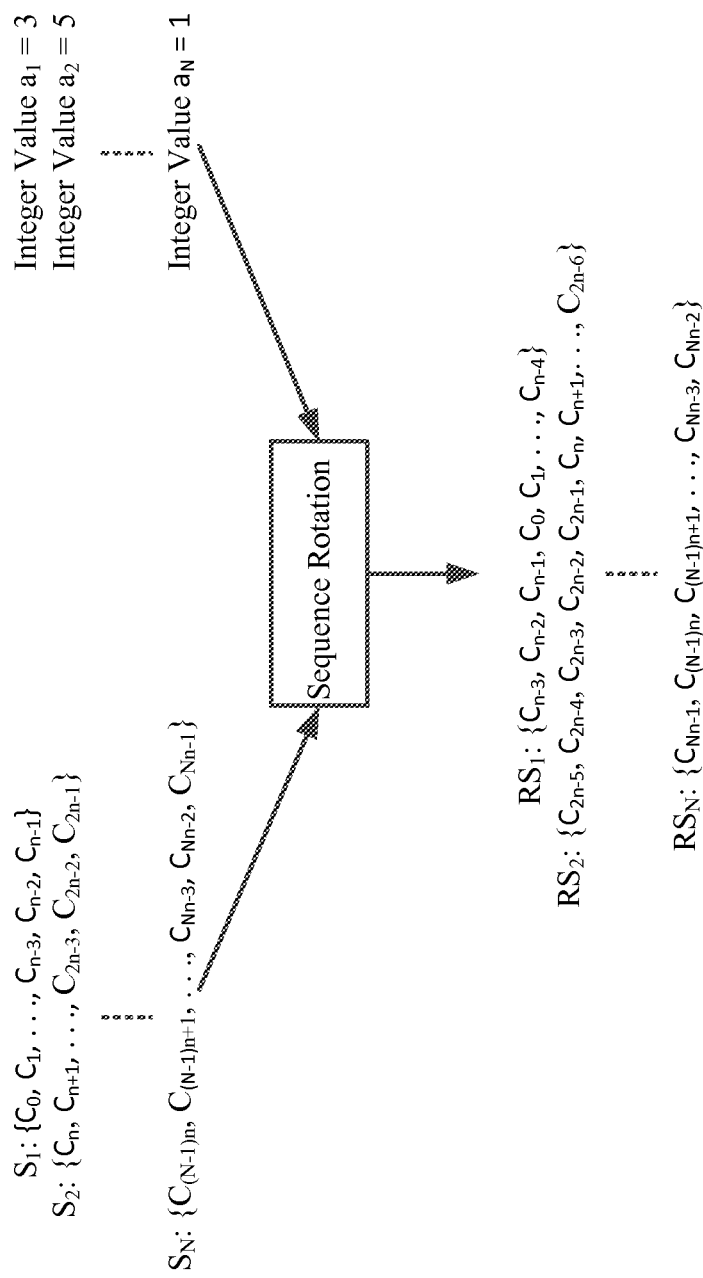

A conceptual diagram of the sequence rotation process is provided in FIG. 2. As shown in FIG. 2, the sequence rotation process involves determining the integer values $a_1, a_2, \ldots, a_N$ which are represented by the first data 104 sequence $d_{1,1}, d_{2,1}, \ldots, d_{N,1}$. For example, if the $k^{th}$ symbol of the first data 104 sequence is in a binary number system format in which each set of eight (8) binary bits represents one (1) character (e.g., a numerical character or an alphabetic character), then each set of eight (8) binary bits represents an integer value between zero (0) and two hundred fifty-five (255). In this scenario, each of the associated $k^{th}$ sequence segment $S_k$ includes two hundred fifty-six (256) numbers or more than two hundred fifty-six (256) numbers. That is the sequence segments $S_1, S_2, \ldots, S_N$ include an amount of values that is equal to or greater than the number of possible integer values which can be represented by each data symbol contained in first data 104 sequence $d_{1,1}, d_{2,1}, \ldots, d_{N,1}$.

Subsequent to determining the integer values $a_1, a_2, \ldots, a_N$ represented by the first data 104 sequence $d_{1,1}, d_{2,1}, \ldots, d_{N,1}$, the numbers or chips of each sequence segment $S_1, S_2, \ldots, S_N$ are cyclically rotated to the right or left by a number of positions defined by the respective integer value $a_1, a_2, \ldots, a_N$. In one scenario, each of the sequence segments $S_1, S_2, \ldots, S_N$ includes an amount of numbers or chips that is equal to the number of possible integer values which can be represented by each set of bits contained in the first data 104 sequence $d_{1,1}, d_{2,1}, \ldots, d_{N,1}$. For example, if a first integer value $a_1$ equals three (3), then the numbers or chips of the first sequence segment $S_1$ are cyclically rotated to the right by three (3) positions. The three (3) excess numbers or chips $C_{n-3}, C_{n-2}, C_{n-1}$ are rotated back in order to the beginning of the first sequence segment $S_1$. In this scenario, if the first sequence segment $S_i$ is defined as $\{C_0, C_1, \ldots, C_{n-3}, C_{n-2}, C_{n-1}\}$, then the resulting rotated sequence segment $RS_1$ may be defined as $\{C_{n-3}, C_{n-2}, C_{n-1}, C_0, C_1, \ldots, C_{n-4}\}$. Similarly, if a second integer value $a_2$ equals five (5), then the numbers or chips of the second sequence segment $S_2$ are cyclically rotated to the right by five (5) positions. The five (5) excess numbers or chips $C_{2n-5}, C_{2n-4}, C_{2n-3}, C_{2n-2}, C_{2n-1}$ are rotated back in order to the beginning of the second sequence segment $S_2$. In this scenario, if the second sequence segment $S_2$ is defined as $\{C_n, C_{n+1}, \ldots, C_{2n-3}, C_{2n-2}, C_{2n-1}\}$, then the resulting rotated sequence segment $RS_2$ may be defined as $\{C_{2n-5}, C_{2n-4}, C_{2n-3}, C_{2n-2}, C_{2n-1}, \ldots, C_{2n-6}\}$. If an $N^{th}$ integer value $a_N$ equals one (1), then the numbers of the $N^{th}$ sequence segment $S_N$ are cyclically rotated to the right by one (1) position, as shown in FIG. 2. The one (1) excess number or chip $C_{Nn-1}$ is rotated back to the beginning of the $N^{th}$ sequence segment $S_N$. In this scenario, if the $N^{th}$ sequence segment $S_N$ is defined as $\{C_{(N-1)n}, C_{(N-1)n+1}, \ldots, C_{Nn-3}, C_{Nn-2}, C_{Nn-1}\}$, then the resulting rotated sequence segment $RS_N$ may be defined as $\{C_{Nn-1}, C_{(N-1)n}, C_{(N-1)n+1}, \ldots, C_{Nn-3}, C_{Nn-2}\}$. Embodiments of the present invention are not limited in this regard. For example, the numbers or chips of each sequence segment $S_1, S_2, \ldots, S_N$ can alternatively be cyclically rotated to the right or left by a number of positions defined by a multiple of a respective integer value $a_1, a_2, \ldots, a_N$. In this scenario, each sequence segments $S_1, S_2, \ldots, S_N$ includes an amount of numbers or chips that is greater than (or a multiple of) the number of possible integer values which can be represented by each set of bits contained in first data 104 sequence $d_{1,1}, d_{2,1}, \ldots, d_{N,1}$. Also, the sequence ordering of the rotated sequence segments $RS_1, RS_2, \ldots, RS_N$ can be constructed as an arbitrary permutation ordering rather than a strictly static rotation as shown in FIG. 2 and illustrated above. In the latter case, the circular cross-correlation will be based on independent re-ordering of the numerical sequence segments. Further, the permutation mapping may incorporate up-to-date information on the spreading sequence chips to maximize the orthogonality of the resulting rotated sequences. One such process for maximizing the orthogonality of sequences is known as the Gram-Schmidt ortho-normalization process. Such approaches are more computationally intensive, so not described in detail herein.

In view of the forgoing, it is evident that the amount of cyclic rotation of the sequence segments $S_1, S_2, \ldots, S_N$ into rotated sequence segments $RS_1, RS_2, \ldots, RS_N$ conveys the content of the first data 104 sequence $d_{1,1}, d_{2,1}, \ldots, d_{N,1}$. More particularly, the amount of cyclic rotation of a sequence segment $S_1, S_2, \ldots,$ or $S_N$ conveys an integer value $a_1, a_2, \ldots,$ or $a_N$ represented by one or more respective bits contained in the first data 104 sequence $d_{1,1}, d_{2,1}, \ldots, d_{N,1}$.

Referring again to FIG. 1, the rotated sequence segments $RS_1, RS_2, \ldots, RS_N$ are then used in a Spread Spectrum Signal Generation ("SSSG") process to generate a baseband spread spectrum signal 112. SSSG processes are well known in the art, and therefore will not be described in detail herein. Any known spread spectrum signal generation process can be used with the present invention without limitation. Notably, the spread spectrum signal generation process generally involves combining a data signal 108 with a spreading sequence. The data signal may be a modulated signal, such as a baseband phase modulated signal or a baseband amplitude modulated signal. Any such discrete-time discrete-amplitude spread spectrum modulation using second data 108 and the rotated sequence segments as the spreading sequence can be used without limitation. The spreading sequence is defined as $\{RS_1, RS_2, \ldots, RS_N\}$. As a result of the performance of the spreading operations, the second data 108 can be communicated through a network via the baseband spread spectrum signal 112.

It should be noted that communication systems implementing the above described sequence rotation process and SSSG process has an improved throughput or information density as compared to conventional communication systems. The improved throughput or information density is at least partially a result of the ability to encode additional data within the spreading sequence rotation. The additional data is encoded within the spreading sequence by cyclically rotating numbers within segments of the spreading sequence in accordance with integer values represented by one or more bits contained in the data 104. Each rotated sequence segment $RS_1, RS_2, \ldots, RS_N$ represents the encoded data from a PRM data symbol with a symbol period defined by the length of the rotated sequence segment. The data 104 can include any type of data, such as command data, control data and user data. Notably, the security of the transmitted information that is provided by the chosen spreading sequence is maintained in the implementing systems of the present invention. Stated differently, the security of the transmitted information is similar to or the same in the implementing systems of the present invention and the conventional spread spectrum communication systems. It should also be noted that the signal energy per symbol is substantially similar between the rotated and non-rotated sequence segments since the signal artifacts induced by filtering and/or other signal processing are negligible.

Figure 3:
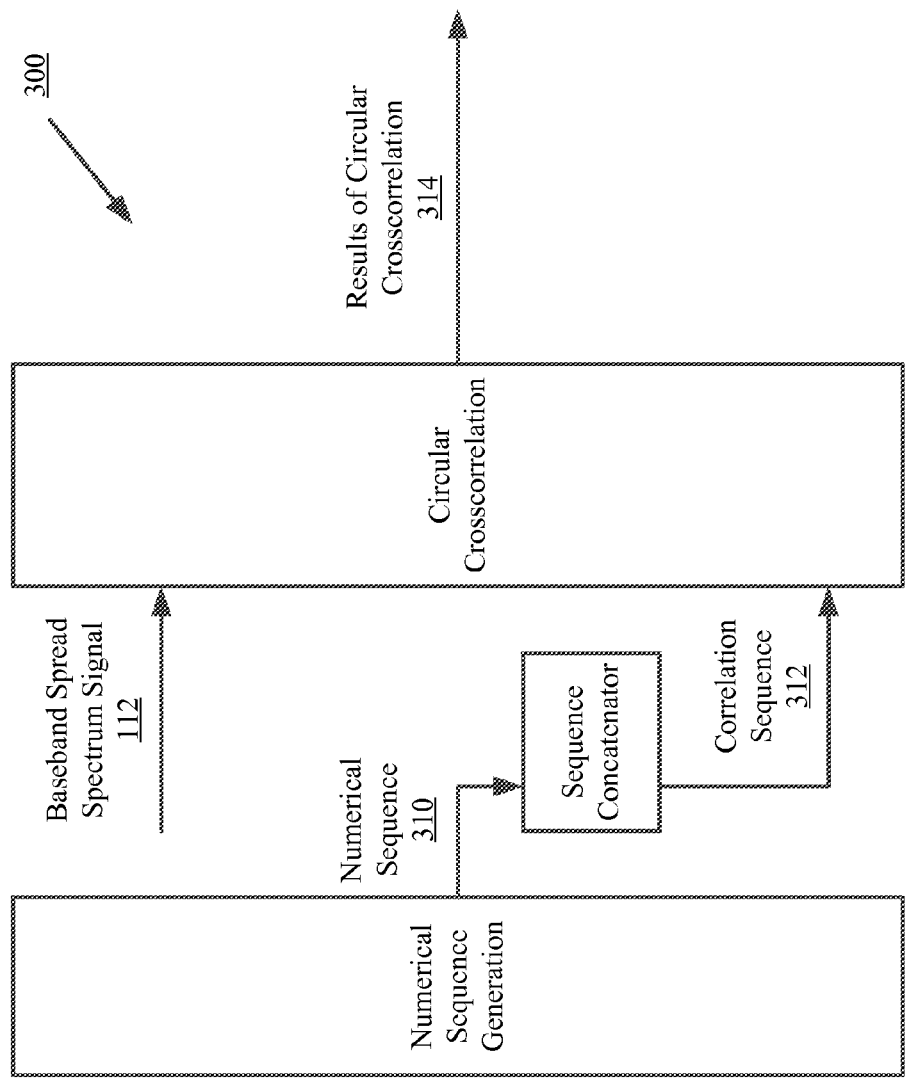
FIGS. 3-4 are conceptual diagrams that are useful for understanding an exemplary cross-correlation process of the present invention.

Referring now to FIG. 3, there is provided a conceptual diagram that is useful for understanding an exemplary cross-correlation process of the present invention. The cross-correlation process begins by generating a coherent numerical sequence 310. The phrase "coherent numerical sequence" refers to a first numerical sequence that has a relationship to a second numerical sequence. Notably, the cross-correlation process reduces to an autocorrelation process when both inputs are the same. The more general form is used here to account for the added contributions of received noise and dynamic rotations in the spreading sequence segments. In this regard, it should be understood that the coherent numerical sequence 310 is similar to or the same as the numerical sequence generated during the above described PRM encoding process. As such, the coherent numerical sequence 310 can include, but is not limited to, a pseudo-random number sequence, a random number sequence and a chaotic number sequence. There are many methods known in the art for generating such numerical sequences. Any such known method can be used with the present invention without limitation. However, it should be noted that the numerical sequence generation performed in FIG. 3 is performed at teh receiving end of a PRM-encoded spread spectrum signal, yet uses a numerical process similar to or identical to the non-rotated sequence segments produced at the transmitting end in some embodiments. Alternatively, the coherent numerical sequence 310 can be a direct sequence generated as a result of the performance of a DSSS modulation process. DSSS modulation processes are well known in the art, and therefore will not be described herein. The coherent numerical sequence 310 is also time synchronized with the numerical sequence generated during the above described PRM encoding process. Methods for signal acquisition and time/phase synchronization of a received signal are well known in the art, and therefore will not be described in detail herein.

Subsequent to the generation of the coherent numerical sequence 310, circular cross-correlation operations are performed using the coherent numerical sequence 310 and the received replica of the baseband spread spectrum signal 112. Notably, the baseband spread spectrum signal 112 is typically assumed to be converted to a much higher center frequency, transmitted across a wireless communications channel, received by the receiving communications device, and down converted back to a baseband communications signal. The received baseband signal will contain both a replica of the original baseband spread spectrum signal 112 and additive noise. Such processes are well understood in the art, so the discussion herein focuses on the novel processing in the emcoding and decoding of data within the baseband signal. The signal transmission may be performed via a wired connection, transmission via a recorded medium (e.g., hard disk or memory), or any other transmission mechanism practiced in the art. The circular cross-correlation operations generally involve detecting a correlation peak when at least a portion of the received replica of the baseband spread spectrum signal 112 and at least a portion of the coherent numerical sequence are aligned in time. In particular, the beginning and ending times of the data symbol duration are synchronized between the transmitter and the receiver. Such synchronization can take the form of a consistent symbol duration/timing epoch or through employing a randomization process such as that used in the Global Positioning System's selective availability function. The circular cross-correlation operations will become more evident as the discussion progresses.

Figure 4:
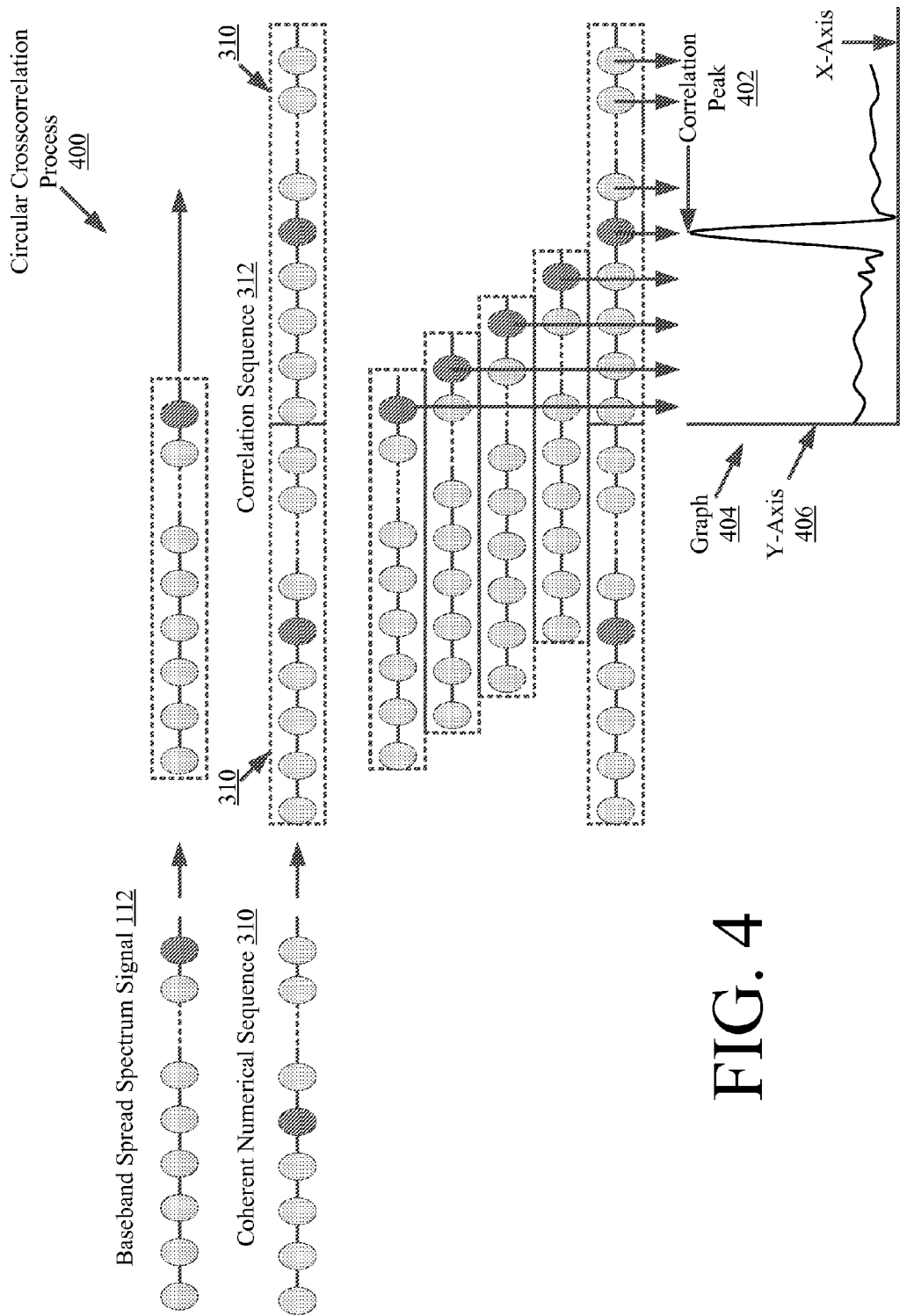

A conceptual diagram of the circular cross-correlation process is provided in FIG. 4. As shown in FIG. 4, the received replica of the baseband spread spectrum signal 112 is compared against a first portion of the correlation sequence 312 to determine a correlation therebetween. The correlation sequence 312 comprises the coherent numerical sequence 310 and a repeated version of the coherent numerical sequence $310_R$. This sequence concatenation is shown in FIG. 3. A plurality of iterations of the correlation operation is performed. Prior to beginning each iteration, a next portion of the correlation sequence 312 is selected which includes all but one (1) of the same numbers as the previous portion of the correlation sequence 312. The plurality of iterations are performed to determine the correlations for all possible rotations of the sequence segments $S_1, S_2, \ldots, S_N$. It should be noted that other, mathematically equivalent techniques exist for performing a circular cross-correlation between two (2) sequences. Such techniques include windowed Fourier transforms and cross ambiguity functions. As such, the cross-correlation process described in FIG. 4 is intended only to give an exemplary method for decoding the PRM data symbol and does not limit the invention in this regard.

As shown in FIG. 4, a graph 404 can be generated which illustrates the successive correlations between the received replica of the baseband spread spectrum signal 112 and the internally generated correlation sequence 312 which were determined in the plurality of iterations of the correlation operation. Subsequently, the plurality of values described in the graph 404 is analyzed to identify correlation peak(s) 402 within known limits of the PRM symbol duration(s). Notably, the correlation observations are effectively a random process when the received replica of the baseband spread spectrum signal 112 contains additice noise or other distortions, such as that notionally visible in graph 404, yet the presence of a distinguishable correlation peak 402 within the expected time range indicates that induced rotation of the sequence segment. Each correlation peak 402 indicates when at least a portion of the received replica of the baseband spread spectrum signal 112 and a portion of the correlation sequence 312 are aligned in time. Notably, it is possible for multiple peaks to be obtained in the plurality of correlation observations when the baseband spread spectrum signal 112 is communicated through a multipath environment. Algorithms for detecting and resolving multipath images are well known in the art, and therefore are not described herein. However, improvements via RAKE reception techniques can be implemented in tandem with the inventive mechanisms without limitation.

A brief discussion of the graph 400 representing the plurality of correlation observations is included to describe how the PRM data symbol is decoded. The location of the correlation peak 402 in the graph 404 relative to a x-axis 406 represents the number of positions to the right or left a respective sequence segment $S_1, S_2, \ldots,$ or $S_N$ was shifted during the above-described PRM encoding process. The "correlation peak" can be indicated as a relative strength between the plurality of correlation observations, as an absolute comparison to a pre-defined correlation value threshold, or via a similar process. Stated differently, the integer "x" value of the point (x, y) at which the correlation peak 402 occurs represents the number of positions to the right or left a respective sequence segment $S_1, S_2, \ldots,$ or $S_N$ was shifted during the above-described PRM encoding process. As such, the "x" value(s) of the observed correlation peak(s) are indicative of the encoded integer value(s) $a_k$ from FIG. 2.

Subsequent to determining the number of positions to the right or left each sequence segment $S_1, S_2, \ldots,$ or $S_N$ was shifted during the above-described PRM encoding process, results 314 of the circular cross-correlation are output, as shown by FIG. 3. The results 314 represent estimates of the PRM symbols.

Exemplary Methods Embodiments of the Present Invention

Figure 5:
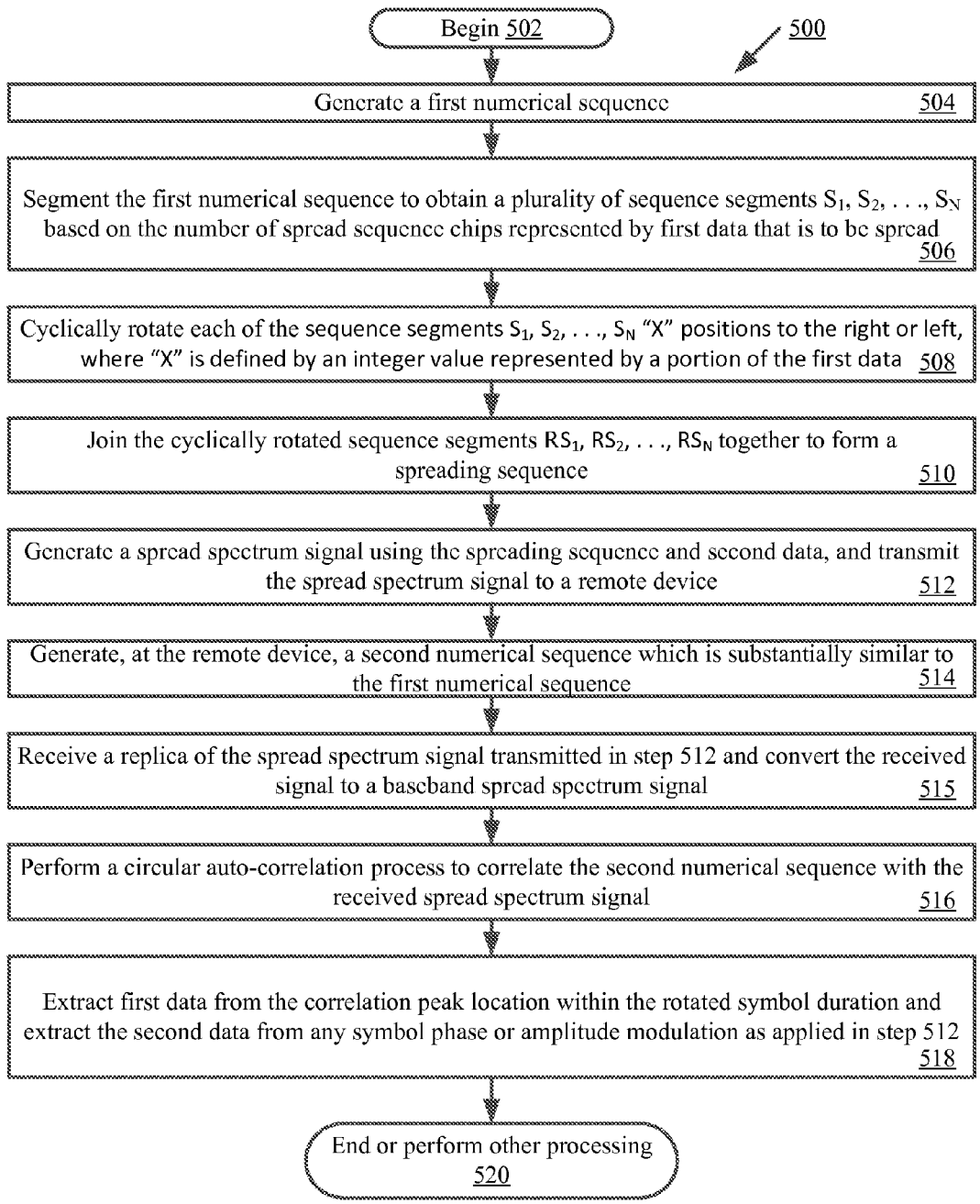
FIG. 5 is a flow diagram an exemplary method for PRM and demodulation that is useful for understanding the present invention.

Referring now to FIG. 5, there is provided a flow diagram of an exemplary method 500 for PRM encoding and circular cross-correlation that is useful for understanding the present invention. Notably, the method 500 implements the concepts described above in relation to FIGS. 1-4.

As shown in FIG. 5, the method 500 begins with step 502 and continues with step 504. In step 504, a first numerical sequence is generated. The first numerical sequence can include, but is not limited to, a pseudo-random number sequence or a chaotic number sequence. The spreading sequence, and thereby the constituent sequence segments, can consist of real-valued number sequences or complex-valued number sequences with any a priori defined amplitude, phase or statistical characteristics. Generation techniques for such spreading sequences are well understood by those skilled in the art, and therefore are not described herein. Any such known method can be used with the present invention without limitation. Alternatively, the first numerical sequence can be a direct sequence generated as a result of the performance of a DSSS modulation process. DSSS modulation processes are well known in the art, and therefore will not be described herein.

After completing step 504, step 506 is performed where the first numerical sequence is segmented to obtain a plurality of sequence segments $S_1, S_2, \ldots,$ or $S_N$. The number of sequence segments generated in step 506 is selected based on: the number of spreading sequence chips that are represented by the first data and that is to be spread; or the amount of data content that is represented by first data (e.g., data 104 of FIG. 1) and that is to be encoded within the first numerical sequence. As described previously, the sequence segments can vary in size. The amount of data encoded in each corresponding sequence segment may also be varied without limitation provided that the amount of possible rotation steps does not exceed the count of numerical sequence values in the associated sequence segment. Non-integer rotations can, in fact, be used provided the sampling rate at the receive end is sufficient to produce the appropriate number of correlation observations to resolve the peak location. The use of non-integer rotations results in Inter-Symbol Interference ("ISI") of successive spreading chips and also requires the use of sample rate interpolation filtering on the correlation sequence 312.

In a next step 508, each of the sequence segments $S_1, S_2, \ldots,$ or $S_N$ are cyclically rotated "X" positions to the right or left. The value of "X" is defined by an integer value $a_1, a_2, \ldots, a_N$ represented by a portion of the first data sequence $d_{1,1}, d_{2,1}, \ldots, d_{N,1}$. As noted above, the "cyclic rotation" operation involves shifting of positions of the chips a certain number of positions to the right or left and rotating backwards/forwards excess chips, in order, to the beginning/end of the respective sequence segment $S_1, S_2, \ldots,$ or $S_N$. The cyclic rotation is performed on a symbol-by-symbol basis and a segment-by-segment basis, producing the rotated sequence segments $RS_1, RS_2, \ldots, RS_N$.

Subsequently, step 510 is performed where the cyclically rotated sequence segments $RS_1, RS_2, \ldots, RS_N$ are joined together to form a spreading sequence. The spreading sequence is defined as $\{RS_1, RS_2, \ldots, RS_N\}$. The spreading sequence is then used in step 512 to generate a spread spectrum signal. Second data is also used in step 512 to modulate the spread spectrum signal. Methods for generating a spread spectrum signal are well known in the art, and therefore will not be described herein. Any known method for generating a spread spectrum signal can be used with the present invention without limitation. Step 512 also involves transmitting the spread spectrum signal to at least one remote device.

Thereafter, step 514 is performed where a second numerical sequence is generated at the remote device. The second numerical sequence is a coherent numerical sequence that is substantially similar to or the same as the first numerical sequence generated in previous step 504. As such, the second numerical sequence can include, but is not limited to, a pseudo-random number sequence or a chaotic number sequence. There are many methods known in the art for generating such numerical sequences. Any such known method can be used with the present invention without limitation. Alternatively, the second numerical sequence can be a direct sequence generated as a result of the performance of a DSSS modulation process. DSSS modulation processes are well known in the art, and therefore will not be described herein. The second numerical sequence is also time synchronized with the first numerical sequence generated in previous step 504. Notably, the sequence parameters for the sequence segment definitions and sequence parameters are known a priori or shared as part of the communications protocol.

In a next step 515, a received replica of the transmitted spreading signal is received at one or more remote devices. This received signal consists of the originally transmitted signal, additive noise, environmental interferers and any channel distortions inherent to the communications channel.

The received signal is converted to a baseband receive signal using processes well known in the art.

In a next step 516, a circular cross-correlation process is performed to correlate the second numerical sequence with the received spread spectrum signal. The circular cross-correlation process is the same as or similar to the cross-correlation process discussed above in relation to FIGS. 3-4, inclusive of sequence concatenation of the second numerical sequence. Upon completing step 516, step 518 is performed where the first data is extracted from the correlation peak location within the rotated symbol duration. Also, the second data is extracted from any symbol phase or amplitude modulation as applied in step 512. In a next step 520, method 500 ends or other processing is performed.

Exemplary Communication Systems Implementing the Present Invention

Figure 6:
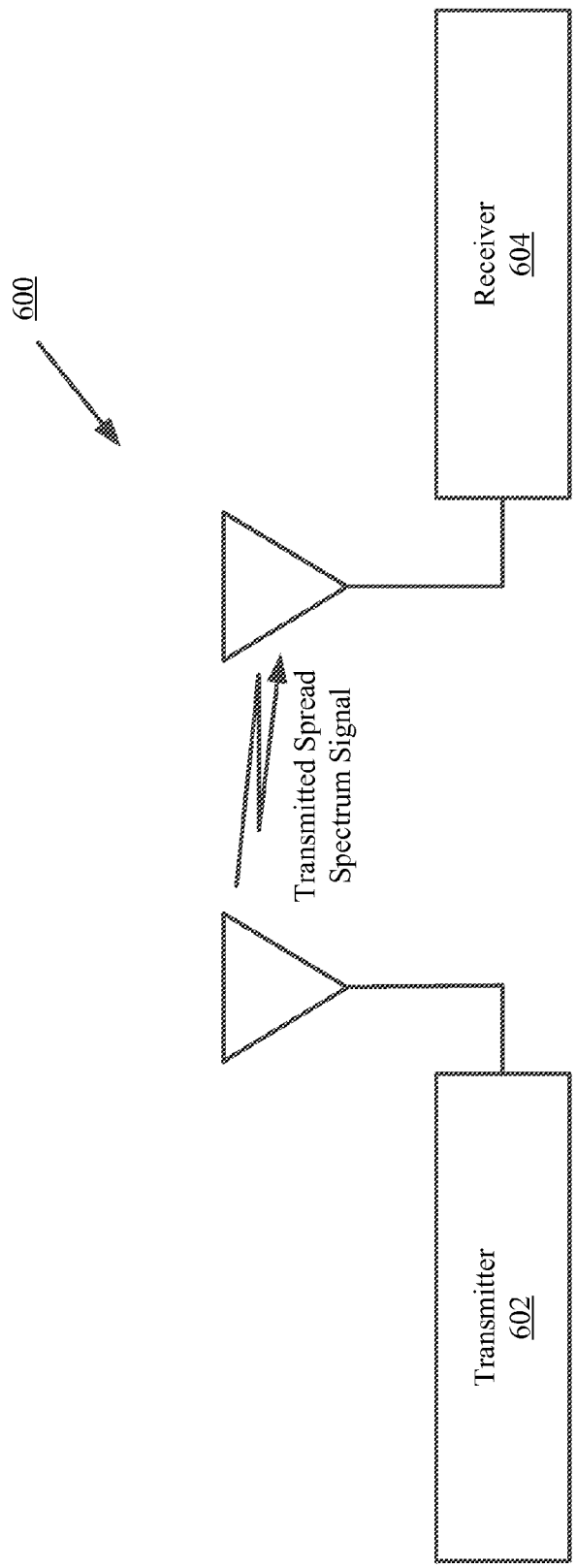
FIG. 6 is a block diagram of an exemplary spread spectrum communications system that is useful for understanding the present invention.

Referring now to FIG. 6, there is provided a block diagram of an exemplary Spread Spectrum Communications System ("SSCS") 600 that is useful for understanding the present invention. Notably, the SSCS 600 implements the concepts described above in relation to FIGS. 1-4 and/or the method 500 described above in relation to FIG. 5. Also, the SSCS 600 has an improved throughput capacity or information density as compared to conventional communication systems. In this regard, the SSCS 600 has the ability to encode first information within a spreading sequence. The first information is encoded within the spreading sequence by cyclically rotating numbers within segments of the spreading sequence in accordance with integer values represented by one or more bits contained in data 104. This type of encoding is referred to herein as PRM encoding. The SSCS 600 also has the ability to encode second information onto a carrier signal via a Spread Spectrum Signal Generation ("SSSG") process. The SSCS 600 further has the ability to obtain the first and second information from the spread spectrum signal via a circular cross-correlation process.

Accordingly, the SSCS 600 is comprised of a transmitter 602 and a receiver 604. The transmitter 602 generally implements the sequence rotation process (or PRM encoding process) described above in relation to FIGS. 1-2 and the SSSG process described above in relation to FIGS. 1-2. The operations of the transmitter 602 will be described in detail below in relation to FIG. 7. The receiver 604 generally implements the circular cross-correlation process described above in relation to FIGS. 3-4. The operations of the receiver 604 will be described in detail below in relation to FIG. 8.

Figure 7:
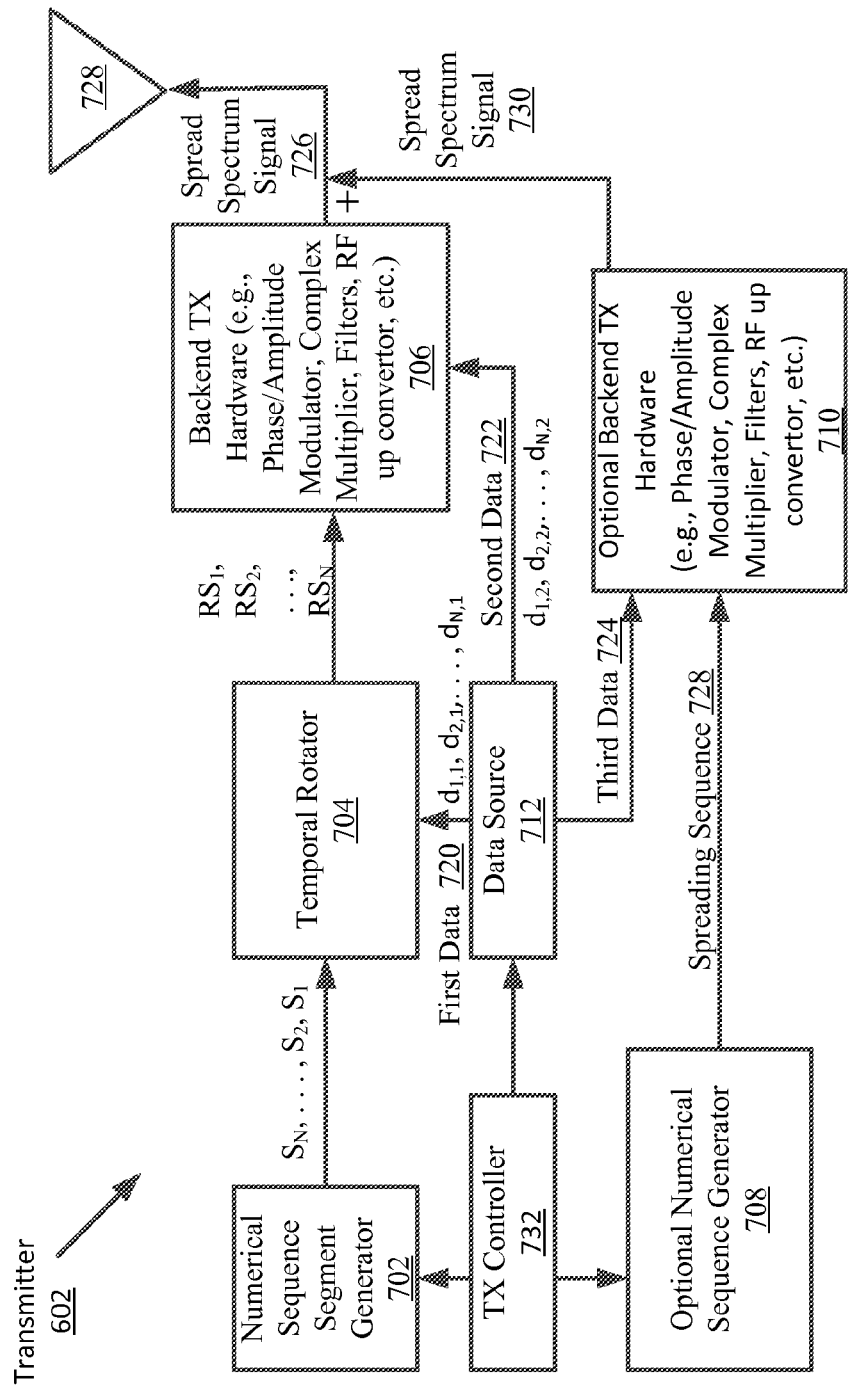
FIG. 7 is a block diagram of the transmitter shown in FIG. 6 that is useful for understanding the present invention.

Referring now to FIG. 7, there is provided a block diagram of the transmitter 602 shown in FIG. 6 that is useful for understanding the present invention. The transmitter 602 generally implements the PRM encoding process and the SSSG process. As such, the transmitter 602 comprises a Numerical Sequence Segment Generator ("NSSG") 702, a temporal rotator 704, a data source 712 and backend TX hardware 706.

During operation, the data source 712 supplies first data 720 to the temporal rotator 704 and second data 722 to the backend TX hardware 706. The first and second data 720, 722 includes, but is not limited to, command data, control data and/or user data. The first and second data 720, 722 can be in any number system format or number radix. For example, each of the first and second data 720, 722 is in a binary number system format consisting of eight (8) bits. Embodiments of the present invention are not limited in this regard.

The NSSG 702 generates a plurality of sequence segments $S_1, S_2, \ldots, S_N$. Each of the sequence segments $S_1, S_2, \ldots, S_N$ includes, but is not limited to, a pseudo-random number sequence or a chaotic number sequence. The sequence segments $S_1, S_2, \ldots, S_N$ are then communicated to the temporal rotator 704 for use in the PRM encoding process. The PRM encoding process generally involves cyclically rotating the numbers of each sequence segment $S_1, S_2, \ldots, S_N$ to the right or left based on the content of first data 720. The cyclic rotation is achieved by shifting of positions of the chips in each sequence segment $S_1, S_2, \ldots, S_N$ a certain number of positions to the right or left and rotating backwards/forwards excess chips, in order, to the beginning/end of the sequence segment $S_1, S_2, \ldots,$ or $S_N$. As a result of this cyclic rotation of the numbers within the sequence segments $S_1, S_2, \ldots, S_N$, the first data 720 is encoded within the sequence segment $S_1, S_2, \ldots, S_N$. In this regard, it should be understood that the amount of cyclic rotation of the sequence segments $S_1, S_2, \ldots, S_N$ conveys the content of the first data 720. More particularly, the amount of cyclic rotation of a sequence segment $S_1, S_2, \ldots,$ or $S_N$ conveys an integer value $a_1, a_2, \ldots,$ or $a_N$ represented by one or more respective bits contained in the first data 720. The results of the PRM encoding process are referred to herein as rotated sequence segments $RS_1, RS_2, \ldots, RS_N$.

The rotated sequence segments $RS_1, RS_2, \ldots, RS_N$ are then communicated to the backend TX hardware 706 for use in the SSSG process. SSSG processes are well known in the art, and therefore will not be described in detail here. However, it should be understood that embodiments of an SSSG process generally involves spreading an amplitude-and-time-discrete baseband signal over a wide intermediate frequency band. This spreading generally consists of multiplying the amplitude-and-time-discrete baseband signal by a spreading sequence. The spreading sequence is defined via the collection of spreading sequence segments $\{RS_1, RS_2, \ldots, RS_N\}$. As such, the backend TX hardware 706 includes, but is not limited to, phase modulators, amplitude modulators, source encoders, symbol formatters, multiplexers, channel encoders, complex multipliers, interpolators, Digital-to-Analog convertors ("DACs"), filters, local oscillators and IF-to-RF convertors. Each of the listed types of backend TX hardware are well known in the art, and therefore will not be described here. The result of the SSSG process is referred to herein as a spread spectrum signal. The spread spectrum signal 726 is then communicated to the antenna element 728 for transmission to receiver 604.

As shown in FIG. 7, the transmitter 602 also includes an optional Numerical Sequence Generator ("NSG") 708 and optional backend TX hardware 710. These components 708, 710 provide an embodiment of a means for facilitating the synchronization of the spread spectrum signal 726 and a coherent numerical sequence generated at the receiver 604 when a low Singal to Noise Ratio ("SNR") exists. The components 708, 710 implement conventional non-rotated spreading sequence generation processes and phase/amplitude modulation processes. In this regard, the NSG 708 generates a spreading sequence 728 (e.g., a pseudo-random number sequence or a chaotic number sequence) that is time synchronized with a numerical sequence $\{S_1, S_2, \ldots, S_N\}$ generated by NSSG 702. This time synchronization is controlled by the TX controller 732. The backend TX hardware 710 generates baseband symbols using optional third data 724 and spreads the baseband data signal over a wide intermediate frequency band. The spreading consists of multiplying the baseband data signal by the spreading sequence 728. The product of the arithmetic operation is referred to herein as a spread spectrum signal 730. The spread spectrum signal 730 is then addedto the spread spectrum signal 726 such that the known timing structure of the spread spectrum signal 730 can be used at the receiver 604 to adapt the time tracking and channel equalization parameters thereof for both the reception of spread spectrum signal 730 and PRM encoded spread spectrum signal 726. Time tracking and channel equalization parameters are well known in the art, and therefore will not be described here. The time tracking and channel equalization parameter adaptation facilitates signal timing synchronization between the transmitter 602 and the receiver 604. Embodiments of the present invention are not limited in this regard. For example, other signal timing synchronization techniques can be used with the present invention, such as techniques which use external timing references (e.g., GPS-based timing signals), techniques which employ relative Media Access Control ("MAC") layer mappings or modulo-n trellis mappings from symbol-to-symbol, and techniques which add preambles to the beginning of signals or periodic ambles throughout signals. Another example is for the third data signal 724 to consist of predominately known symbols, allowing coherent integration and/or use as a coherent tracking signal with a shared channel. Each external timing mechanism, including the optional co-transmitted spread spectrum signal 730, have their benefits and drawbacks, with some working better than others in different operational scenarios. The spread spectrum signal(s) is(are) then transmitted to one or more receiving devices through antenna 728, as depicted in FIG. 6.

Figure 8:
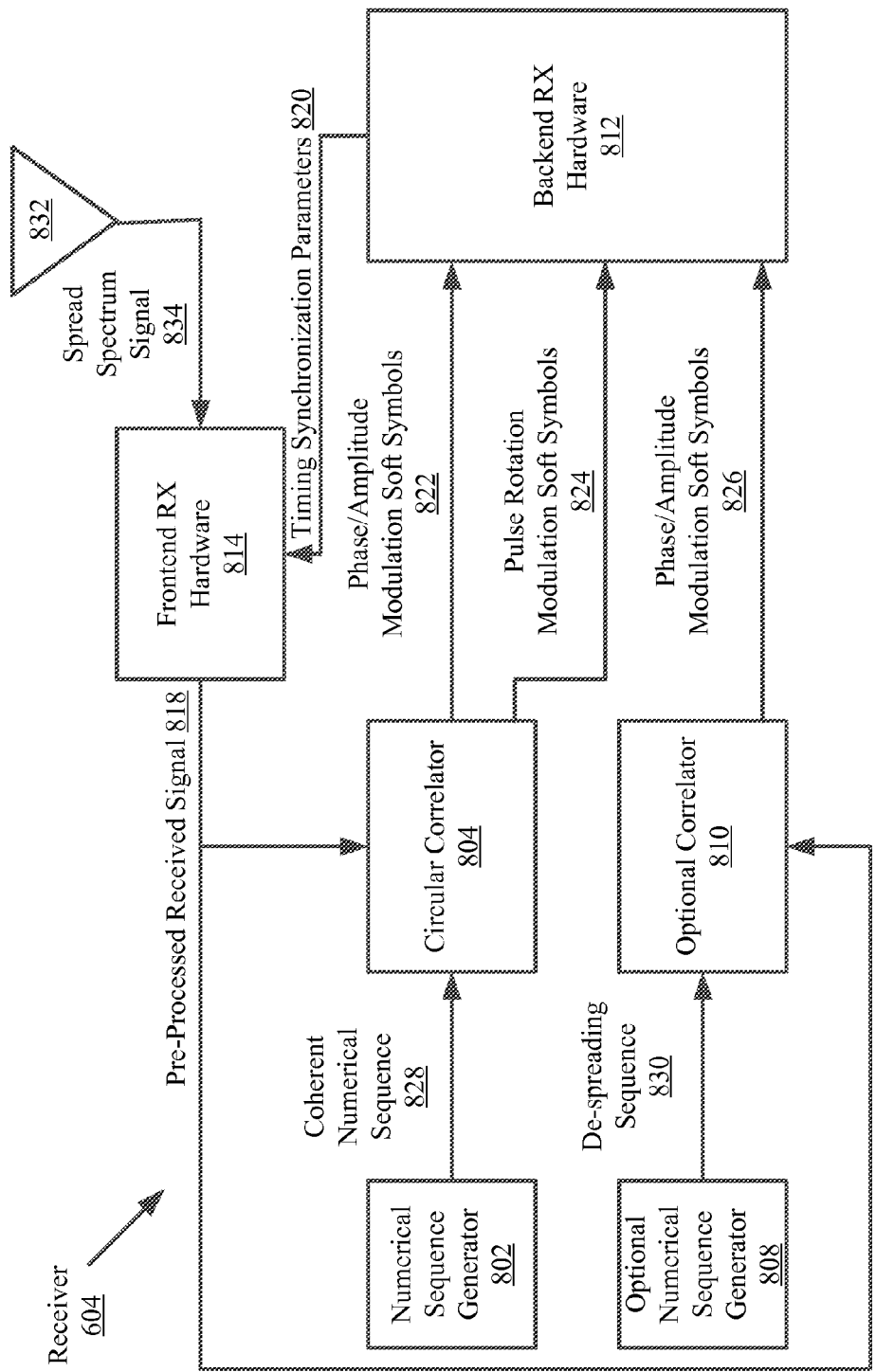
FIG. 8 is a block diagram of the receiver shown in FIG. 6 that is useful for understanding the present invention.

Referring now to FIG. 8, there is provided a block diagram of the receiver 604 shown in FIG. 6 that is useful for understanding the present invention. The receiver 604 generally implements the signal reception, tracking and PRM cross-correlation processes. As such, the receiver 604 comprises an antenna 832, frontend RX hardware 814, an NSG 802, a circular correlator 804 and backend RX hardware 812.

During operation, the frontend RX hardware 814 performs pre-processing on a received spread spectrum signal 834 obtained through antenna 832. The pre-processing includes, but is not limited to, filtration, amplification, RF-to-IF conversion, analog-to-digital conversion, IF translation and/or symbol timing recovery. As such, the frontend RX hardware 814 includes, but is not limited to, amplifiers, filters, an RF-to-IF convertor, an Analog-to-Digital Convertor("ADC"), multipliers, local oscillators, an IF translator, a complex multiplier and/or symbol timing recovery components. The spread spectrum signal 834 shown in FIG. 8 is a received replica of the transmitted signal 726 from FIG. 7, and that is may contain noise, interfering signals and/or other channel distortions inherent in the propagation through a wireless communications channel. The output of the frontend RX hardware 814 is referred to herein as a pre-processed received signal 818. The pre-processed received signal 818 is communicated from the frontend RX hardware 814 to the circular correlator 804.

At the circular correlator 804, a circular cross-correlation process is performed using the pre-processed received signal 818 and a correlation sequence. The correlation sequence comprises the coherent numerical sequence 828 and a repeated version of the coherent numerical sequence 828 as described previously with respect to FIGS. 3-4. The coherent numerical sequence 828 is generated by the NSG 802. The coherent numerical sequence 828 includes, but is not limited to, a pseudo-random number sequence or a chaotic number sequence. The coherent numerical sequence 828 is the same as and time synchronized with a numerical sequence represented by the sequence segments $S_1, S_2, \ldots, S_N$ generated by the NSSG 702 of the transmitter 602. The circular cross-correlation process is also performed using timing synchronization parameters 820 with synchronization maintained within the frontend RX hardware 814. The timing synchronization parameters 820 include, but are not limited to, PRM symbol boundary parameters and/or functions of sequence index parameters (e.g., matched filter taps as a function of time).

The circular cross-correlation process involves detecting correlation peaks when at least a portion of the pre-processed received signal 818 and at least a portion of the coherent numerical sequence 828 are aligned in time. Notably, each of the correlation peaks is detected within a known limit of a PRM symbol duration. The correlation peak detection is achieved by: performing a plurality of iterations of a correlation operation which involves comparing the pre-processed received signal 818 against portions of the coherent numerical sequence 828 to determine correlations therebetween; analyze values representing the correlations for all possible rotations of the sequence segments $S_1, S_2, \ldots, S_N$ ("correlation values") to identify the highest correlation values. These identified correlation values represent the correlation peaks 402 of graph 404 described above in relation to FIG. 4. As such, each of the identified correlation values indicates when at least a portion of the pre-processed received signal 818 and a portion of the coherent numerical sequence 828 are aligned in time and the signal is received with sufficient SNR to detect the signal and decode the encoded data. The identified correlation values also specify the number of positions to the right or left a respective sequence segment $S_1, S_2, \ldots,$ or $S_N$ was shifted during the above-described PRM encoding process. After detecting the rotations of the sequence segments $S_1, S_2, \ldots,$ or $S_N$, the circular correlator 804 converts the detection into output information, such as PRM data 824 corresponding to transmitted first data 720. The PRM data 824 can include soft decisions or estimates for PRM symbols. Soft decisions or soft values are values that represent the probability that a particular symbol in a sequence is an estimate of its ideal value(s). For example, if a binary symbol is a BPSK symbol, then a soft-value for a particular bit can indicate that a probability of a bit being a one (1) is p(1)=0.3. Conversely, the same bit can have a probability of being a zero (0) which is p(0)=0.7. Such resolved soft symbols representing transmitted first data 720 may be further decoded using a hard decision block (within backend RX hardware 812) or any pre-defined forward error correction method (also within backend RX hardware 812). Such symbol decision operations are well known in the art, and therefore are not described herein. Notably, soft symbol error correction algorithms can achieve efficiency improvements when they branch on the highest "N" correlation values rather than performing blind searches.

The circular correlator 804 also generates phase/amplitude modulated soft symbols 822 representing second data, which includes soft decisions or estimates of phase/amplitude modulated symbols. The phase/amplitude modulated soft symbols 822 are generated by combining the pre-processed received signal 818 and a de-spreading sequence after pulse rotations are resolved. The de-spreading sequence is defined by rotated versions of the sequence segments $S_1, S_2, \ldots, S_N$, i.e., $\{RS_1, RS_2, \ldots, RS_N\}$. It should be noted that the PRM soft symbols 822 and phase/amplitude modulation symbols 824 can be obtained in the same steps using complex-valued cross-correlations, where PRM soft symbols are obtained from the temporal location of the correlation peak, while phase/amplitude soft symbols are obtained from the relative magnitude and phase of the observed correlation peak. Any related circular correlation process can be used without limitation.

In some embodiments, the circular correlator 804 is implemented by a matched filter receiver. The matched filter receiver detects impulse locations by outputting a single correlation observation value per clock cycle and then comparing correlation observations to a chosen/pre-defined threshold. The matched filter receiver efficiently performs a sliding window correlation that peaks when two sequences are aligned in time. Moreover, the matched filter taps may be synchronously buffered such that successive symbols may be processed independently using new filter coefficients corresponding to the matched filter reception of the subsequent numerical sequence segment. Embodiments of the present invention are not limited in this regard.

The data 822, 824 output from the circular correlator 804 is then processed by the backend RX hardware 812. The backend RX hardware 812 can include, but is not limited to, hard decision circuits, symbol-to-bits conversion circuits, source decoders, and interfaces to communicate the received data to an external device (not shown). Each of the listed components of the backend RX hardware 812 are well known in the art, and therefore will not be described here.

As shown in FIG. 8, the receiver 604 also includes an optional NSG 808 and an optional correlator 810. These components 808, 810 provide an embodiment of a means for facilitating the synchronization of the spread spectrum signal 726 and a coherent numerical sequence 828. The components 808, 810 implement conventional de-spreading processes. In this regard, the NSG 808 generates a de-spreading sequence 830 (e.g., a pseudo-random number sequence or a chaotic number sequence) that is time synchronized with the spreading sequence 728 generated by the transmitter 602. The correlator 810 correlates the spread spectrum signal 818 with the de-spreading sequence 830 to obtain phase/amplitude modulation data 826 which includes soft decisions or estimates of phase/amplitude modulated symbols. The phase/amplitude modulation data 826 is then communicated to backend RX hardware 812. The correlator 810 and/or the backend RX hardware 812 may determine the timing synchronization parameters 820 using the phase/amplitude modulation soft symbols 826. The timing synchronization parameters 820 are communicated to the frontend RX hardware 814 for synchronizing the transmitter 602 and receiver 604.

Figure 9:
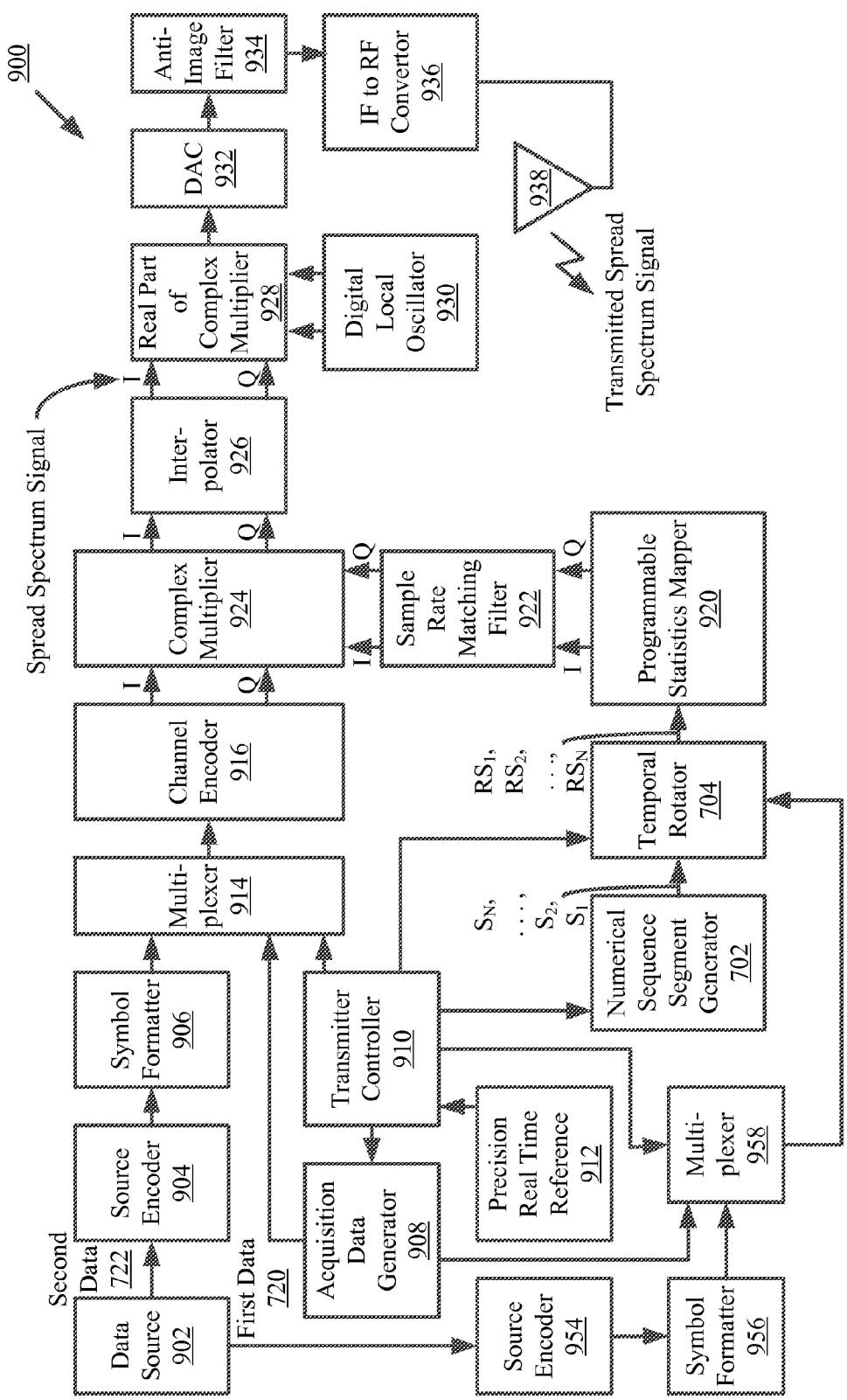
FIG. 9 is a block diagram of another exemplary transmitter that is useful for understanding the present invention.

Referring now to FIG. 9, there is provided a block diagram of another exemplary transmitter 900 that is useful for understanding the present invention. As shown in FIG. 9, the transmitter 900 comprises a data source 902, source encoders 904, 954, symbol formatters 906, 956, multiplexers 914, 958, a channel encoder 916, a programmable statistics mapper 920, a sample rate matching filter 922, a complex multiplier 924, an acquisition data generator 908, a transmitter controller 910 and a precision real time reference 912. The transmitter 900 also comprises an interpolator 926, a real part of a complex multiplier 928, a digital local oscillator 930, a DAC 932, an anti-image filter 934, and IF-to-RF convertor 936 and an antenna element 938. The listed components 902-916, 920-938 and 954-958 are the same as or similar to the respective components 202-216 and 220-238 of FIG. 2 of U.S. Patent Publication No. 2009/0034727 to Chester et al. ("the Chester publication"), the entire disclosure of which is incorporated herein by reference. The discussion of components 202-216 and 220-238 provided in the Chester publication is sufficient for understanding components 902-916, 920-938 and 954-958 of FIG. 9. As such, the reader is directed to the disclosure of the Chester publication for a detailed discussion of components 202-216 and 220-238. The transmitter 900 also comprises NSSG 702 and temporal rotator 704. NSSG 702 and temporal rotator 704 were described above in relation to FIG. 7.

Figure 10:
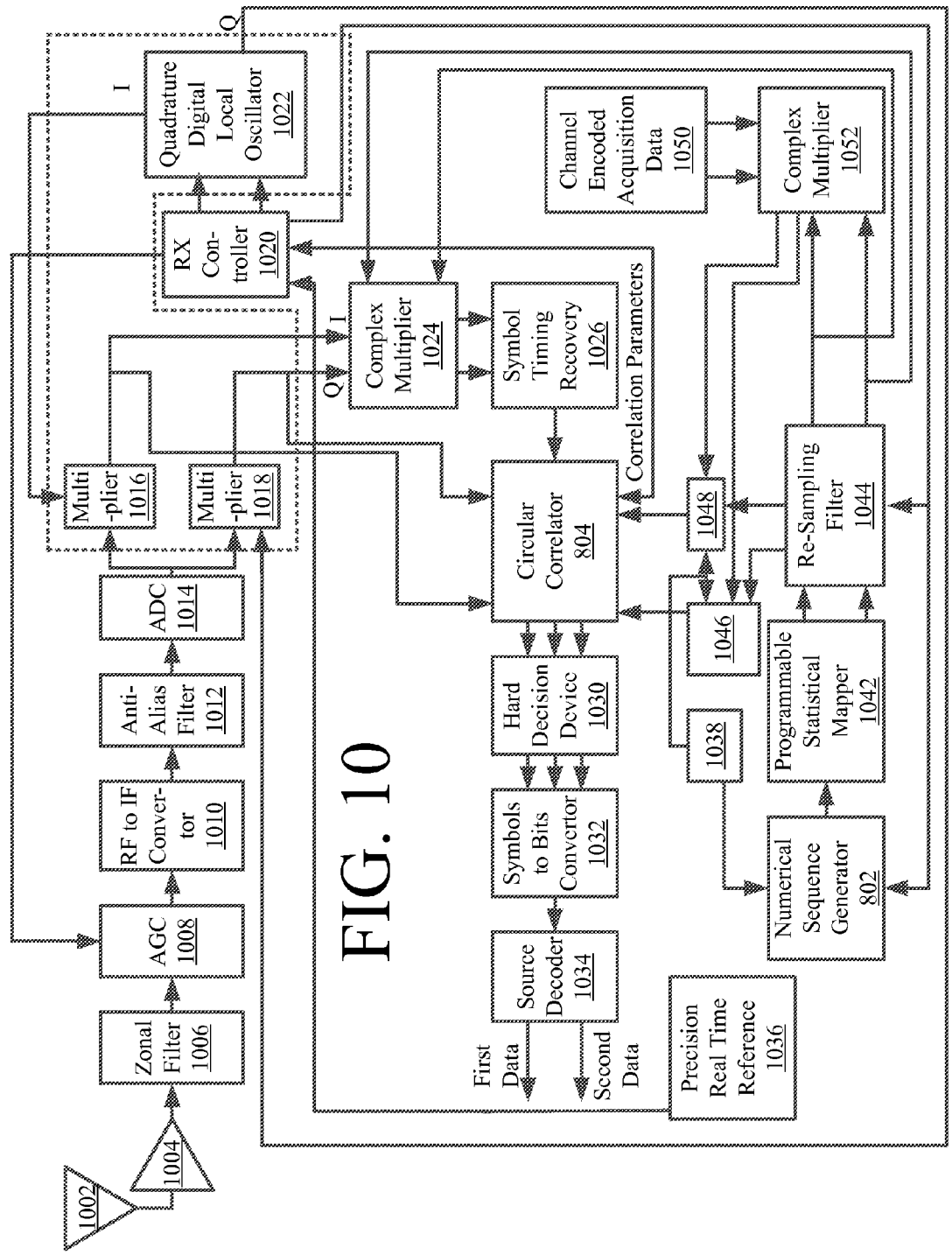
FIG. 10 is a block diagram of another exemplary receiver that is useful for understanding the present invention.

Referring now to FIG. 10, there is provided a block diagram of another exemplary receiver 1000 that is useful for understanding the present invention. As shown in FIG. 10, the receiver 1000 comprises an antenna element 1002, a low noise amplifier 1004, a zonal filter 1006, an automatic gain control amplifier 1008, an RF-to-IF convertor 1010, an anti-alias filter 1012, an ADC 1014, multipliers 1016, 1018, a receiver controller 1020, a quadrature digital local oscillator 1022, complex multipliers 1024, 1052, a symbol timing recovery circuit 1026, a hard decision device 1030, a symbol-to-bits convertor 1032, a source decoder 1034, a precision real time reference 1036, a receiver controller 1038, multiplexors 1046, 1048, a programmable statistical mapper 1042, a re-sampling filter 1044 and a channel encoded acquisition data generator 1050. The listed components 1002-1026, 1030-1038 and 1042-1052 are the same or similar to the components 602-626, 630-638 and 642-652 shown in FIG. 6 of Chester publication. The discussion of components 602-626, 630-638 and 642-652 provided in the Chester publication is sufficient for understanding components 1002-1026, 1030-1038 and 1042-1052 of FIG. 10. As such, the reader is directed to the disclosure of the Chester publication for a detailed discussion of components 602-626, 630-638 and 642-652. The receiver 1000 also comprises NSG 802 and circular correlator 804. NSG 802 and circular correlator 804 were described above in relation to FIG. 8.

In view of the forgoing, it should be apparent that a benefit of the present invention is that a pulse rotated modulated spread spectrum signal can carry additional information over a non-rotated modulation. This additional information is easily varied and controlled via dynamic algorithms which simply change the number of possible rotations steps to a subset of numbers. The present invention also maintains the Peak-to-Average Power Ratio ("PAPR") of the core spreading sequence, rather than increasing the PAPR as is done in amplitude modulation. Finally, the present invention increases the practical throughput capacity of a spread waveform, while allowing the spread waveform to retain the fundamental limits of security inherent to many spread spectrum sequences like chaotic spreading sequences.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for Pulse Rotation Modulation ("PRM") in a spread spectrum communication system, comprising: generating, by an electronic circuit, a plurality of first segments of a numerical sequence based on a number of first data symbols; and encoding, by said electronic circuit, said first data symbols within said numerical sequence by using a sequence rotation process which includes (a) shifting positions of numbers contained in each of said plurality of first segments "X" positions in a first direction, where "X" is defined as an integer value represented by a respective portion of said first data symbols, (b) moving one of a last "X" numbers of said plurality of first segments to a beginning of a respective segment of said plurality of first segments, and a first "X" numbers of said plurality of first segments to an end of said respective segment of said plurality of first segments; and generating a spread spectrum signal which is pulse rotation modulated by combining a data signal with said numerical sequence having said first data symbols encoded therein, said data signal comprising second data symbols that are different than said first data symbols and not encoded using said sequence rotation process, wherein said plurality of first segments comprise a spreading code for said data signal.

2. The method according to claim 1, wherein said respective portion of said first data symbols comprises one or more bits which represents one of said first data symbols.

3. The method according to claim 1, wherein each of said plurality of first segments includes an amount of numbers that is equal to or greater than a number of possible integer values which are able to be represented by said respective portion of said first data symbols.

4. The method according to claim 1, wherein a sequence ordering of a rotated sequence segment is constructed as an arbitrary permutation ordering.

5. The method according to claim 1, further comprising decoding said numerical sequence having said first data symbols encoded therein.

6. The method according to claim 1, wherein said data signal is one of a baseband phase modulated signal and a baseband amplitude modulated signal.

7. The method according to claim 1, further comprising decoding said spread spectrum signal to obtain said first data symbols and second data symbols therefrom.

8. The method according to claim 7, wherein said decoding comprises
generating a coherent numerical sequence which is the same as, and time synchronized with, said numerical sequence,
performing a circular cross-correlation process using said spread spectrum signal and said coherent numerical sequence to determine an amount of rotation for each of said plurality of first segments of said numerical sequence, and
generating estimates of PRM symbols based on said previously determined amounts of rotation for said plurality of first segments of said numerical sequence.

9. The method according to claim 7, wherein said decoding comprises
generating a coherent numerical sequence which is the same as, and time synchronized with, said numerical sequence,
performing a circular cross-correlation process using said spread spectrum signal and said coherent numerical sequence to determine an amount of rotation for each of said plurality of first segments of said numerical sequence,
cyclically rotating each of a plurality of second segments of said coherent numerical sequence by a previously determined respective amount of rotation, and
generating estimates of modulation symbols by combining said spread spectrum signal with said coherent numerical sequence that comprises said plurality of second segments which were previously cyclically rotated.

10. A method for Pulse Rotation Modulation ("PRM") in a spread spectrum communication system, comprising: generating, by an electronic circuit, a plurality of first segments of a numerical sequence based on a number of first data symbols; and encoding, by said electronic circuit, said first data symbols within said numerical sequence by using a sequence rotation process which includes (a) shifting positions of numbers contained in each of said plurality of first segments "X" positions in a first direction, where "X" is defined as an integer value represented by a respective portion of said first data symbols, (b) moving one of a last "X" numbers of said plurality of first segments to a beginning of a respective segment of said plurality of first segments, and a first "X" numbers of said plurality of first segments to an end of said respective segment of said plurality of first segments; and decoding said numerical sequence having said first data symbols encoded therein by (c) generating a coherent numerical sequence which is the same as, and time synchronized with, said numerical sequence, (d) performing a circular cross-correlation process using said numerical sequence having said first data symbols encoded therein and said coherent numerical sequence to determine an amount of rotation for each of said plurality of first segments of said numerical sequence, and (e) generating estimates of PRM symbols based on said previously determined amounts of rotation for said plurality of first segments of said numerical sequence.

11. A system for Pulse Rotation Modulation ("PRM"), comprising: at least one electronic circuit configured to: generate a plurality of first segments of a numerical sequence based on a number of characters represented by first data symbols; and encode said first data symbols within said numerical sequence by using a sequence rotation process which configured to (a) shift positions of numbers contained in each of said plurality of first segments "X" positions in a first direction, where "X" is defined as an integer value represented by a respective portion of said first data symbols, (b) move one of a last "X" numbers of said plurality of first segments to a beginning of a respective segment of said plurality of first segments, and a first "X" numbers of said plurality of first segments to an end of said respective segment of said plurality of first segments; and said at least one electronic circuit further configured to generate a spread spectrum signal which is pulse rotation modulated by combining a data signal with said numerical sequence having said first data symbols encoded therein, said data signal comprises second data symbols that are different than said first data symbols and not encoded using said sequence rotation process, wherein said plurality of first segments comprise a spreading code for said data signal.

12. The system according to claim 11, wherein said respective portion of said first data symbols comprises one more bits which represents one of said first data symbols.

13. The system according to claim 11, wherein each of said a plurality of first segments includes an amount of numbers that is equal to or greater than a number of possible integer values which are able to be represented by said respective portion of said first data symbols.

14. The system according to claim 11, wherein a sequence ordering of a rotated sequence segment is constructed as an arbitrary permutation ordering.

15. The system according to claim 11, wherein at least a second electronic circuit is further configured to decode said numerical sequence having said first data symbols encoded therein.

16. The system according to claim 15, where said numerical sequence is decoded by
generating a coherent numerical sequence which is the same as, and time synchronized with,. said numerical sequence,
performing a circular cross-correlation process using said numerical sequence having said first data symbols encoded therein and said coherent numerical sequence to determine an amount of rotation for each of said plurality of first segments of said numerical sequence, and generating estimates of PRM symbols based on said previously determined amounts of rotation for said plurality of first segments of said numerical sequence.

17. The method according to claim 15, wherein said electronic circuit is further configured to decode said spread spectrum signal to obtain said first data symbols and second data symbols therefrom.

18. The system according to claim 17, wherein said spread spectrum signal is decoded by
   generating a coherent numerical sequence which is the same as, and time synchronized with,. said numerical sequence,
   performing a circular cross-correlation process using said spread spectrum signal and said coherent numerical sequence to determine an amount of rotation for each of said plurality of first segments of said numerical sequence, and
   generating estimates of PRM symbols based on said previously determined amounts of rotation for said plurality of first segments of said numerical sequence.

19. The method according to claim 17, wherein said spread spectrum signal is decoded by
   generating a coherent numerical sequence which is the same as, and time synchronized with, said numerical sequence,
   performing a circular cross-correlation process using said spread spectrum signal and said coherent numerical sequence to determine an amount of rotation for each of said plurality of first segments of said numerical sequence,
   cyclically rotating each of a plurality of second segments of said coherent numerical sequence by a previously determined respective amount of rotation, and
   generating estimates of modulation symbols by combining said spread spectrum signal with said coherent numerical sequence which comprises said plurality of second segments which were previously cyclically rotated.

20. The system according to claim 11, wherein said data signal is a baseband phase modulated signal or a baseband amplitude modulated signal.

21. A method for Pulse Rotation Modulation ("PRM") in a spread spectrum communication system, comprising: generating, by an electronic circuit, a plurality of first segments of a numerical sequence based on a number of first data symbols; and encoding, by said electronic circuit, said first data symbols within said numerical sequence by (a) shifting positions of numbers contained in each of said plurality of first segments "X" positions in a first direction, where "X" is defined as a non-integer value, (b) moving one of a last "X" numbers of said plurality of first segments to a beginning of a respective segment of said plurality of first segments, and a first "X" numbers of said plurality of first segments to an end of said respective segment of said plurality of first segments; and generating a spread spectrum signal which is pulse rotation modulated by combining a data signal with said numerical sequence having said first data symbols encoded therein, said data signal comprising second data symbols that are different than said first data symbols and not encoded using said sequence rotation process, wherein said plurality of first segments comprise a spreading code for said data signal.

22. The method according to claim 21, wherein each of said plurality of first segments is re-sampled in order to support a rotation of an integer number of numerical sequence values to a beginning or end of said respective segment.

* * * * *